United States Patent [19]

Moore et al.

[11] Patent Number: 5,536,061
[45] Date of Patent: Jul. 16, 1996

[54] AUTOMOTIVE VEHICLE BODY WITH POWERED SLIDING SIDE DOOR

[75] Inventors: Thomas S. Moore, Northville; Phillip D. Cruise, Royal Oak, both of Mich.

[73] Assignee: Chrysler Corporation, Auburn Hills, Mich.

[21] Appl. No.: 349,589

[22] Filed: Dec. 5, 1994

[51] Int. Cl.⁶ ........................................................ B60J 5/06
[52] U.S. Cl. .............................. 296/155; 49/358; 49/360
[58] Field of Search ................................ 296/155, 146.4; 49/360, 358

[56] References Cited

U.S. PATENT DOCUMENTS

| | | | |
|---|---|---|---|
| 3,331,428 | 7/1967 | Ford | 160/331 |
| 4,612,729 | 9/1986 | Sato | 49/362 |
| 4,897,959 | 2/1990 | Worden | 49/18 |
| 5,301,468 | 4/1994 | Kamezaki | 49/225 |

FOREIGN PATENT DOCUMENTS

| | | | |
|---|---|---|---|
| 464720 | 1/1992 | European Pat. Off. | 296/155 |
| 2384933 | 11/1978 | France | 49/360 |
| 3205675 | 9/1983 | Germany | 49/360 |
| 30827 | 2/1983 | Japan | 296/155 |
| 199722 | 10/1985 | Japan | 296/155 |

*Primary Examiner*—Gary C. Hoge
*Attorney, Agent, or Firm*—Margaret A. Dobrowitsky

[57] ABSTRACT

An automotive vehicle body has a side opening that is opened and closed by a sliding door. The door is operated with a power drive mechanism that is pivotally mounted thereon and extends through the side opening. The power drive mechanism includes a reversible electric motor driven friction drive wheel and is spring biased to forcibly engage this wheel with a drive/guide track that is located beneath the vehicle floor and attached to the vehicle body. The friction drive wheel rides on the drive/guide track to open and close the door and also helps guide and stabilize its sliding movement. The spring load on the friction drive wheel is limited so as to provide sliding door operation with the motor under normal conditions and allow slippage at the friction drive wheel to cease door movement when the door encounters a physical object in the door opening.

10 Claims, 2 Drawing Sheets

AUTOMOTIVE VEHICLE BODY WITH POWERED SLIDING SIDE DOOR

TECHNICAL FIELD

This invention relates to an automotive vehicle body with a powered sliding side door and more particularly to a power drive mechanism mounted directly on the sliding door for opening and closing same with a friction wheel drive.

BACKGROUND OF THE INVENTION

In automotive vehicles of the passenger delivery van type, it has become common practice to provide the vehicle body with a relatively large side opening that is located immediately behind the passenger side front door and is opened and closed with a sliding door. The sliding door is typically mounted with hinges on horizontal tracks on the vehicle body for guided sliding movement between a closed position flush with the vehicle body closing the side opening and an open position located outward of and alongside the vehicle body rearward of the side opening. The sliding door may be operated manually as is most generally the case or with a power operated system to which the present invention is directed. In powering the sliding door, a power drive mechanism including a reversible electric motor may be mounted in the vehicle body and connected to operate the door through a cable system as disclosed in U.S. Pat. No. 5,046,283. It is also known to mount a power drive mechanism on the sliding door and effect its sliding movement with a rack and pinion gear as disclosed in U.S. Pat. No. 4,612,729. Such prior power sliding door systems, even where the power drive mechanism is mounted on the side door, require considerable accommodating space and modifications in the vehicle body structure and are not readily installed in an upgrading manner to convert an existing manually operated sliding door to a power operated one. Moreover, both the cable system and the rack and pinion gear drive are positive type mechanical drives between the motor and the sliding door and either the mechanical drive must be interrupted in some manner such as by disengaging a clutch incorporated therein or the motor must be stopped in some manner such as with special control circuitry to prevent the sliding door from closing on a physical object such as a package or a part of the anatomy of a person remaining in the side door opening.

SUMMARY OF THE INVENTION

In the present invention, a power sliding door operating system is provided having a power drive mechanism with a friction drive that may be readily incorporated in a conventional sliding door mounting system without requiring any special accommodating space in the vehicle body or the sliding door. In addition, the invention allows utilization of an existing sliding door lower guide track as a drive track for the friction drive to move the sliding door between its open and closed positions. Moreover, the power drive mechanism operating through the friction drive is then also utilized to provide stabilizing support of the sliding door in its sliding movement as well as power to open and close same.

The power drive mechanism is pivotally mounted directly on the sliding door and includes a friction drive wheel that is driven through a speed reduction gear drive by a reversible electric motor having a traveling power cable that is connected with the power supply serving the vehicle's electrical system by a three-position switch. The power drive mechanism extends through the door opening at the bottom thereof to position the friction drive wheel to engage a smooth drive track that is attached to the vehicle body beneath the floor and extends along the lower edge of the door opening. A preloaded spring forcibly pivots the power drive mechanism relative to the sliding door to position and maintain the friction drive wheel in frictional driving engagement with the drive track to operate the sliding door and also help guide the door in a spring stabilized condition in its sliding movement between its open and closed positions. The spring is preloaded to a predetermined degree to provide just sufficient force on the friction wheel drive to effect normal sliding door opening and closing and to allow slippage of the friction drive wheel to cease side door movement when the sliding door encounters a physical object such as a package or person and experiences a relatively low reaction force that is unlikely to cause damage to the physical object or the door.

The present invention is readily adapted to a conventionally mounted, manually operated, sliding side door wherein the door is normally mounted by three vertically and longitudinally spaced hinges on the side door that have rollers received and guided on separate, vertically spaced, horizontal guide tracks on the vehicle body. The minivans currently produced by Chrysler Corporation (the assignee of this invention) are examples of an automotive vehicle body having such a sliding side door mounting system. In their mounting system, the lower hinge is a rigid guide hinge that does not normally pivot, is normally mounted on the interior lower front corner of the side door, extends through the door opening at the bottom thereof, and has a roller engaging a guide track that is located beneath the vehicle floor and attached to the vehicle body structure. The power drive mechanism in the present invention is adaptable to replace such a lower hinge and engage the lower hinge guide track with the friction drive wheel. The existing lower guide track is then used as a drive track as well as a guide track to effect operation of the sliding door with the friction drive wheel and with the latter taking the place of the former guide roller in also guiding the door but now in a spring loaded stabilized manner because of the spring load of the friction drive wheel on this track. The power drive mechanism of the present invention including the electric motor, gear drive and the friction drive wheel forms a very compact unit that requires no added space in the sliding door or the vehicle body in adapting to such an installation.

It is therefore an object of the present invention to provide a new and improved sliding door power operating system in an automotive vehicle.

Another object is to provide an automotive vehicle body with a powered sliding side door having a power operating mechanism mounted directly on the sliding door and employing friction wheel drive with a drive track attached to the vehicle body to open and close the door.

Another object is to provide an automotive vehicle sliding door power operating system having a power drive mechanism that is mounted directly on the sliding door and operates through the normal sliding door opening in the vehicle body with associated apparatus on the vehicle body located beneath the floor to open and close the door.

Another object is to provide an automotive vehicle sliding side door power operating system having a motor driven friction drive wheel that is pivotally mounted on the door so as to extend through the normal side door opening in the vehicle body and is preloaded to engage with a drive track on the vehicle body beneath the floor to open and close the door but slip to cease door movement when the door encounters a physical object.

Another object is to provide an automotive vehicle sliding door power operating system that is readily adapted to replace a part of a sliding door mounting system on the sliding door without requiring any special mounting accommodations on the door or in the vehicle body.

Another object is to provide an automotive vehicle sliding door power operating system including a compact power drive mechanism having a friction drive wheel driven by a reversible electric motor through a speed reducing gear drive wherein this mechanism is pivotally mounted on the sliding door and extends through the normal door opening and is spring biased to engage the friction drive wheel with a drive track mounted on the vehicle body beneath the vehicle floor to effect opening and closing of the door but allow the friction drive wheel to slip on the drive track to cease door movement when the door encounters a physical object.

These and other objects, advantages and features of the present invention will become more apparent from the following description with reference to the accompanying drawings wherein:

DETAILED DESCRIPTION OF THE DRAWINGS

Figure 1:
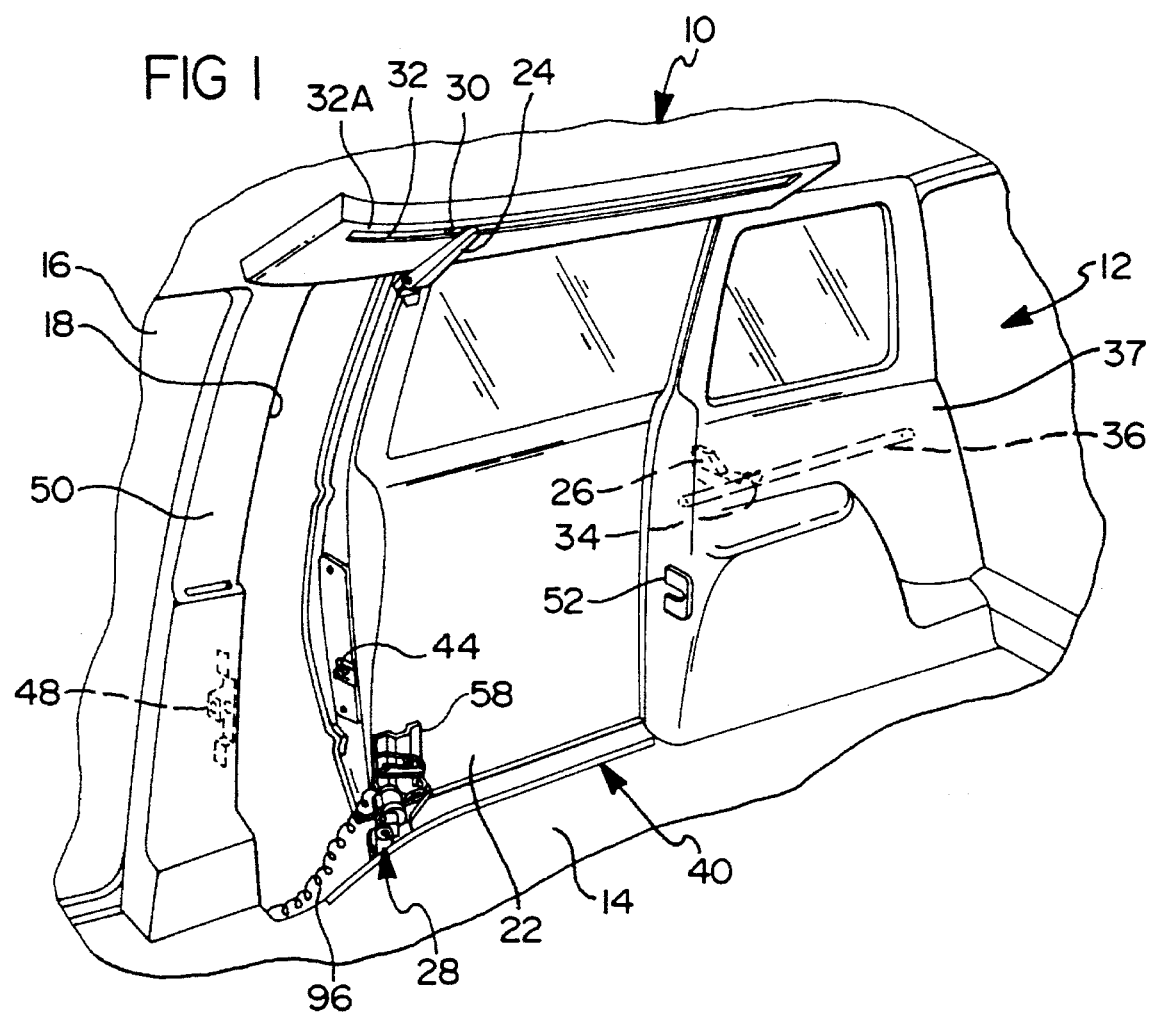
FIG. 1 is an interior perspective view of a motor vehicle of the van type having incorporated therein a preferred embodiment of the power side door operating system according to the present invention.
Figure 2:
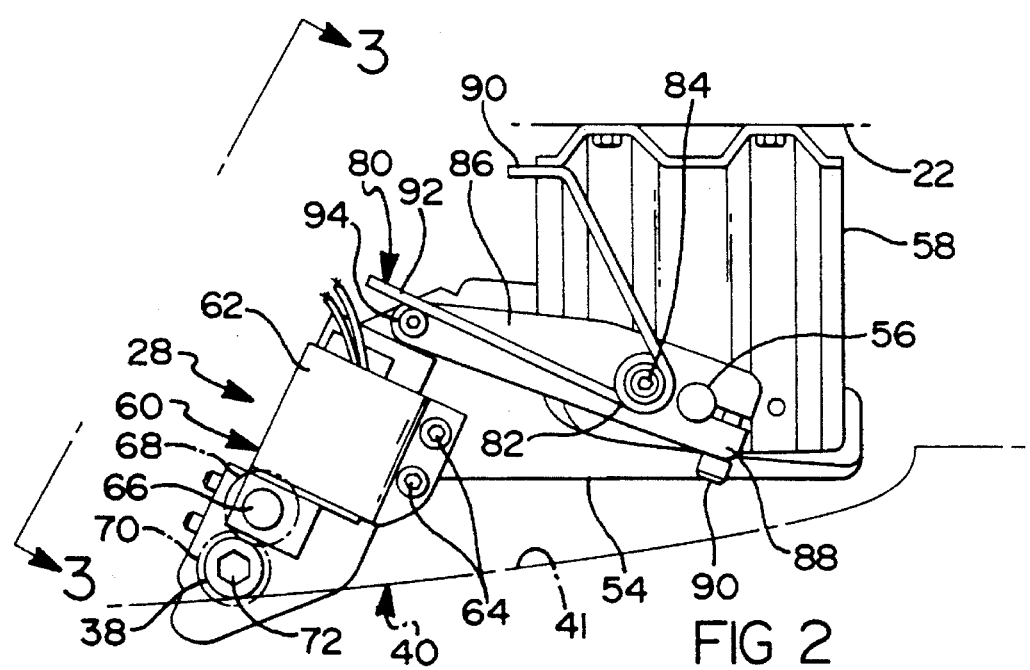
FIG. 2 is an enlarged plan view of the power slide door actuator in FIG. 1.
Figure 3:
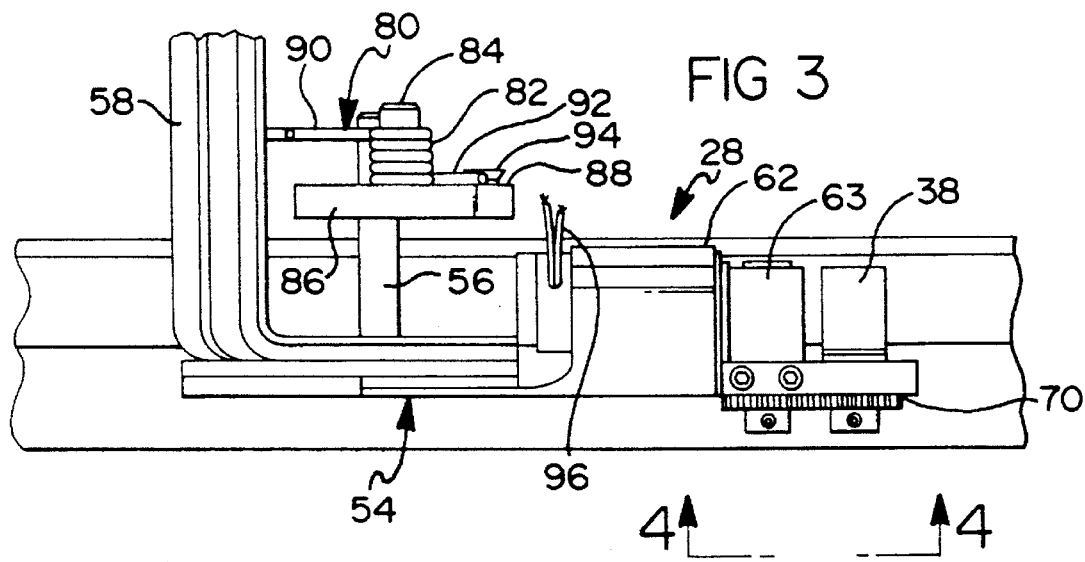
FIG. 3 is a view taken along the line 3—3 in FIG. 2 when looking in the direction of the arrows.
Figure 4:
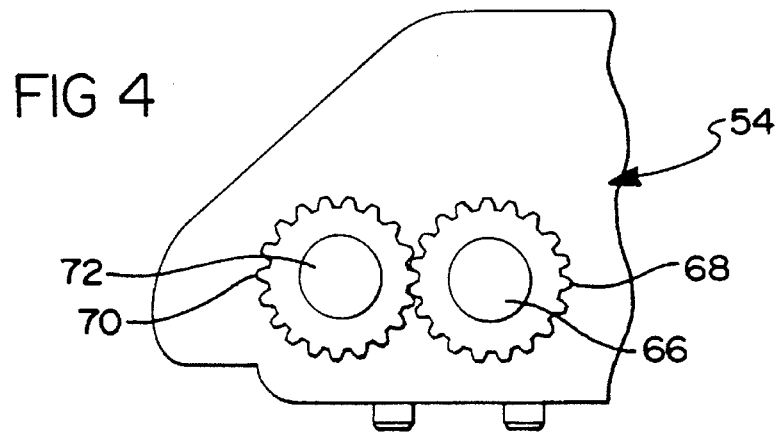
FIG. 4 is a view taken along the line 4—4 in FIG. 3 when looking in the direction of the arrows.

Referring to FIG. 1, there is illustrated an automotive vehicle of the minivan type comprising a body 10 whose structure defines a passenger compartment 12 with a floor 14, and a right side front opening 16 and rear opening 18 that provide access to the respective front and rear areas of the passenger compartment. The front side opening 16 is opened and closed by a front door (not shown) that is mounted in a conventional manner on the vehicle body for pivotal movement about a vertical axis at the forward edge of the door. The rear side opening 18 is located immediately behind and is substantially larger than the front side opening 16, and is opened and closed by a relatively large sliding door 22. The sliding door 22 is mounted on the vehicle body with a three point mounting system that includes an upper hinge 24, a center hinge 26 and a power drive mechanism 28 that are all mounted on the interior side of the sliding door.

The upper hinge 24 is located at the upper front corner of the sliding door, pivots about a horizontal axis, and supports a roller 30. The roller 30 is supported on the hinge 24 for rotation about a vertical axis and is received and guided by a horizontal upper guide track 32 that is curved inward at its forward end 32A. The upper guide track 32 is located inward of and extends along the upper edge of the sliding door opening and is attached to the vehicle body structure at the roof line. The center hinge 26 is located at the rear edge of the sliding door opening at about the center height thereof, pivots about a vertical axis, and supports a roller assembly 34 that is received and guided by a horizontal center guide track 36. The center track 36 is attached to and extends along the right rear quarter panel 37 of the vehicle body rearward of the sliding door opening.

The power drive mechanism 28 is pivotally mounted on the lower front corner of the sliding door and has a friction drive wheel 38 that is driven about a vertical axis and forcibly engages a horizontal lower track 40 under a spring load as described in more detail later. The lower track 40 is attached to the vehicle body beneath the floor 14, is co-extensive with the upper guide track 32, serves as both a drive track and a guide track and is also curved inward at its forward end in parallel relationship with the upper guide track 32. The lower drive/guide track 40 is located inward of the sliding door opening and extends along the bottom edge or sill thereof and has a smooth outwardly facing vertical surface 41 extending horizontally therealong that is engaged by the friction drive wheel 38.

Figure 5:
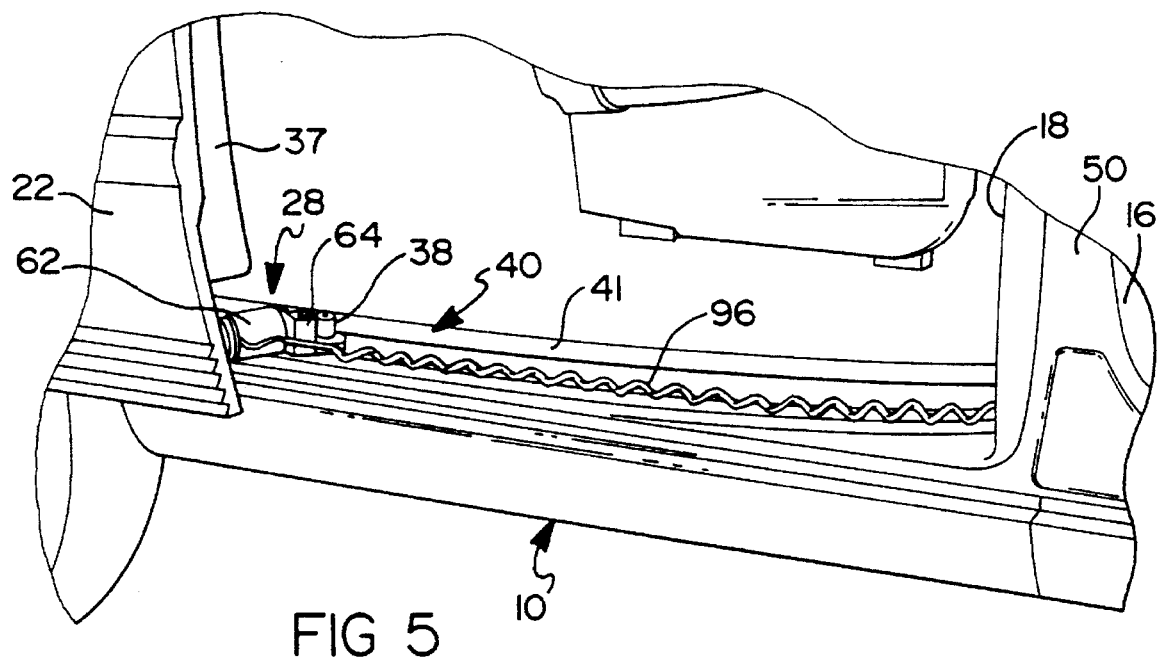
FIG. 5 is an exterior perspective view of the power side door operating system in FIG. 1.

The free turning rollers 30 and 34, and the friction drive wheel 38 co-operate with the respective upper guide track 32, center guide track 36 and lower drive/guide track 40 to support, guide and retain the large sliding door 22 for sliding movement between a closed position flush with the vehicle body closing the sliding door opening and an open position located outward of and alongside the right rear quarter panel 37 rearward of the sliding door opening as illustrated in FIG. 5. For effecting this path of sliding door movement, the upper guide track 32 and lower drive/guide track 40 have curved sections of relatively short length at their forward end that curve inward to move the front edge of the sliding door laterally into and out of the side door opening 18 while the center hinge 26 pivots to provide lateral door movement at the rear edge thereof. In this sliding door arrangement, the upper guide track 32 and center guide track 36 support the full weight of the large sliding door and the power drive mechanism 28 urges the lower edge of the door outward to help stabilize the door on the center and upper guide tracks. The sliding door mounting system is the same as that in the minivans currently produced by Chrysler Corporation but wherein the power drive mechanism 28 replaces a non-pivoting lower hinge that is attached to the sliding door at the same location and supports a roller that is guided by the same lower track 40 and freely rotates about a vertical axis for manual operation of the sliding door.

The sliding door 22 is held and locked in its closed position by a latch/power lock system including a front striker 44 and a rear striker (not shown) that are mounted on the respective front and rear edge of the door. The front striker 44 engages a latch 48 mounted on a side body pillar 50 between the front door opening and the sliding door opening. The rear striker engages a latch 52 mounted on the vehicle body at the rear edge of the sliding door opening 18. The latch/power lock system is of a suitable conventional type that includes an interior mounted door handle for manually releasing both latches and is operable to latch and lock the sliding door in its closed position and to release the sliding door for opening and closing movement.

The power drive mechanism 28, in addition to the friction drive wheel 38, includes a support plate 54 that is pivotally mounted on the sliding door 22 with a vertical pivot pin 56 that is attached at its lower end to one end of this plate. The pivot pin 56 extends upward from the support plate and is received and retained in a hole in a mounting bracket 58 that is bolted to the interior side of the sliding door 22 at the lower front corner thereof. The pivot pin 56, mounting bracket 58 and the associated end portion of the support plate 54 thus form a hinge supporting the power drive mechanism 28 on the sliding door for pivotal movement about a vertical axis; i.e. that of the pivot pin.

A DC motor/reduction gear unit 60 comprising a reversible DC motor 62 and a right-angle speed reduction gear box 63 is mounted with bolts 64 on the upper side of the support plate 54. The gear box 63 has an output shaft 66 that is at right angles to the motor axis and extends vertically downward through an opening in the support plate. A spur gear 68 is attached to the lower end of the output shaft 66 beneath the support plate and meshes with a second spur gear 70 that is attached to the lower end of a vertical friction wheel drive shaft 72. The drive shaft 72 is rotatably supported and axially contained on the support plate 54 and extends upward therefrom. The friction drive wheel 38 which is made of Nylon® and has a cylindrical surface that engages the track 40 is attached to the upper end of the drive shaft 72 and is thus connected to be driven by the motor 62 at reduced speed by the gear drive therebetween.

The power drive mechanism 28 extends horizontally at a forward angle from the sliding door 22 through the sliding door opening just above the lower edge thereof and at a lower elevation than the floor 14 to position the friction drive wheel 38 to engage the lower drive/guide track 40. A torsion spring 80 forces this friction drive wheel engagement and comprises a center coiled section 82 that is retained with a bolt 84 on a torque arm 86 that is attached at one end to the pivot pin 56. The torque arm is adjustably attached to the pivot pin by a clamp 88 that is integrally formed with this end of the torque arm and tightened by a bolt 90. The torsion spring has radially extending end portions 90 and 92 that extend from the opposite ends of the coiled section 82 and respectively engage the mounting bracket 58 and a spring seat collar 94 attached to the distal end of the torque arm 86. The torsion spring 80 operates through the torque arm 86 and pivot pin 56 to force pivoting of the support plate 54 and thereby the friction drive wheel 38 about the parallel vertical axis of the pivot pin and in a direction away from the sliding door and toward the lower drive/guide track 40 to effect traction drive engagement between the friction drive wheel and this track. The reaction for this spring load is taken through the sliding door by the center and upper hinges, their rollers and guide tracks and produces as an added advantage a spring loaded stabilizing support of the sliding door as it is moved between it closed and open positions The motor 62 is selectively energizeable in a polarity sense to drive the friction drive wheel 38 on the drive/guide track 40 in a rearward door opening direction with rotation of the motor in one direction and in a forward door closing direction on this track with rotation of the motor in the opposite direction. The electrical power for operating the motor is provided by a traveling self-coiling power cable 96 that is connected to the motor and travels therewith by extension and contraction of its coils. The power cable 96 is connected with the vehicle's storage battery by a switch (not shown) of a suitable conventional type that is manually operable to effect energization of the motor as described above to open and close the sliding door and also stop the motor at any time during sliding door movement and thereby stop the door at any intermediate position. It will be understood that the sliding door operating switch is located in the passenger compartment in a convenient location such as on the instrument panel or on the driver side door. It is also contemplated that the motor could be operated with a control circuit including switches that are activated by door movement to automatically stop the motor when the sliding door reaches its open and closed positions. It is also contemplated that the motor could be operated in conjunction with the sliding door power latch/lock control system and also with a wireless remote switch of a suitable conventional type. It is further contemplated that a rechargeable battery for powering the motor could be mounted on the sliding door and connected with a charging circuit in the closed door position.

The torsion spring 80 is preloaded to a predetermined limited degree by angular adjustment of the torque arm 86 with its clamp 88 so that the friction drive wheel is held against the smooth drive/guide track 40 with just sufficient force to effect wheel traction to slide the door 22 between its open and closed positions under normal conditions wherein the door experiences no external physical resistance to its movement. The preload is limited so that should the sliding door encounter a physical object in its path during closing, the spring preload is no longer sufficient to maintain traction at the friction drive wheel which then slips on the lower drive/guide track ceasing further door movement without having to stop the motor. The preload is adjustable with the clamp 88 and can, for example, be set to allow friction drive wheel slippage to stop powered movement of the sliding door by the resistance of a person's hand with only a few pounds of resisting force.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. In combination, an automotive vehicle body having a side opening; a sliding door; a mounting system mounting said sliding door on said vehicle body for sliding movement between a closed position closing said side opening and an open position clearing said side opening; and a power door operating system for operating said sliding door including a smooth drive/guide track attached to said vehicle body and extending along and interior of said side opening, a power drive mechanism extending through said side opening, mounting means mounting said power drive mechanism on an interior side of said sliding door for pivotal movement, said power drive mechanism including a reversible electric motor and a friction drive wheel powered by said reversible electric motor, and preloaded spring means forcibly pivoting said power drive mechanism to position and maintain said friction drive wheel in engagement with said smooth drive/guide track with a predetermined limited force just sufficient to maintain friction drive wheel traction for unobstructed sliding door movement so that said friction drive wheel is operable to roll under power from said reversible electric motor on said smooth drive/guide track and both move and guide said sliding door between said open and closed positions and is allowed to slip on said smooth drive/guide track to cease door movement when said sliding door encounters a physical object.

2. A combination as set forth in claim 1 wherein said drive/guide track has a vertical surface extending horizontally therealong engaged by said friction drive wheel, said friction drive wheel has a vertically oriented axis of rotation, and said mounting means mounts said power drive mechanism on said sliding door for pivotal movement about a vertically oriented pivot axis.

3. A combination as set forth in claim 1 wherein said power drive mechanism includes a speed reduction gear drive drivingly connecting said reversible electric motor to said friction drive wheel.

4. A combination as set forth in claim 1 wherein said spring means comprises a torsion spring operatively arranged between said sliding door and said power drive mechanism.

5. A combination as set forth in claim 1 wherein said mounting means includes a mounting bracket attached to said sliding door, a pivot pin supported by said mounting bracket and attached to said power drive mechanism, a torque arm attached to said pivot pin, and said spring means comprises a torsion spring mounted on said torque arm and operatively engaging said sliding door and said torque arm to effect the forced pivoting of said power drive mechanism.

6. A combination as set forth in claim 5 wherein said torque arm is adjustably attached by clamp means to said pivot pin to provide for adjustably preloading said torsion spring.

7. In combination, a motor vehicle body having a floor and a side opening; a sliding door; a sliding door mounting system supporting said sliding door on said vehicle body for sliding movement between a closed position flush with said vehicle body closing said side opening and an open position located outward of and alongside said vehicle body rearward of said side opening; and a power door operating system for operating and also helping guide movement of said sliding door; said power door operating system including a smooth drive/guide track attached to said vehicle body beneath said floor and extending along a bottom edge of said side opening in parallel relationship with the guided movement of said sliding door provided by said sliding door mounting system, a power drive mechanism extending through said side opening adjacent said bottom edge, mounting means mounting said power drive mechanism for pivotal movement on an interior side of said sliding door at a lower front corner thereof, said power drive mechanism including a reversible electric motor and a friction drive wheel powered by said reversible electric motor, and spring means forcibly pivoting said power drive mechanism relative to said sliding door to position and maintain said friction drive wheel in engagement with said smooth drive/guide track with a predetermined limited force just sufficient to maintain friction drive wheel traction for unobstructed sliding door movement, said friction drive wheel being operable with drive from said reversible electric motor to roll on said smooth drive/guide track under the force of said spring means to move and also help guide said sliding door in a stabilized condition between said open and closed positions and to slip on said smooth drive/guide track to cease sliding door movement when said sliding door encounters a physical object and said friction drive wheel then experiences a sliding door resisting force slightly exceeding the ability of said predetermined limited force to maintain traction between said friction drive wheel and said smooth drive/guide track.

8. A combination as set forth in claim 7 wherein said smooth drive/guide track has a vertical surface extending horizontally therealong engaged by said friction drive wheel, said friction drive wheel has a vertically oriented axis of rotation, and said mounting means mounts said power drive mechanism on said sliding door for pivotal movement about a vertical axis.

9. A combination as set forth in claim 7 wherein said power drive mechanism includes a speed reduction gear drive drivingly connecting said reversible electric motor to said friction drive wheel.

10. A combination as set forth in claim 7 wherein said mounting means includes a mounting bracket attached to said sliding door, a pivot pin supported by said mounting bracket and attached to said power drive mechanism, a torque arm attached to said pivot pin, and said spring means comprises a torsion spring mounted on said torque arm and operatively engaging said sliding door and said torque arm to effect the forced pivoting of said power drive mechanism.

* * * * *